United States Patent [19]

Dietz et al.

[11] 4,240,929

[45] Dec. 23, 1980

[54] POLYMERIZATION OF OLEFINS

[75] Inventors: Richard E. Dietz; Oscar D. Nowlin, both of Bartlesville, Okla.

[73] Assignee: Phillips Petroleum Company, Bartlesville, Okla.

[21] Appl. No.: 3,439

[22] Filed: Jan. 15, 1979

[51] Int. Cl.$^3$ .............................................. C08F 4/64
[52] U.S. Cl. ............................ 252/429 B; 252/429 C; 526/125
[58] Field of Search ....................... 252/429 C, 429 B

[56] References Cited

U.S. PATENT DOCUMENTS

| 3,316,314 | 4/1967 | Van den Berg | 252/429 C X |
|---|---|---|---|
| 3,644,318 | 2/1972 | Diedrich et al. | 252/429 C X |
| 3,718,636 | 2/1973 | Stevens et al. | 252/429 C X |
| 3,772,261 | 11/1973 | Faltings et al. | 526/159 |
| 3,784,481 | 1/1974 | Lassau et al. | 252/429 C X |
| 3,821,186 | 6/1974 | Grant | 252/429 C X |
| 3,859,231 | 1/1975 | Kochhar et al. | 252/429 B X |
| 3,888,835 | 6/1975 | Ito et al. | 252/429 C X |
| 3,901,863 | 8/1975 | Berger et al. | 252/429 C |
| 3,993,588 | 11/1976 | Thukral | 252/429 C |

FOREIGN PATENT DOCUMENTS 2347577 5/1974 Fed. Rep. of Germany.

*Primary Examiner*—Patrick Garvin

[57] ABSTRACT

A catalyst composition can be obtained by treating a magnesium halide-tetravalent, halogenated titanium compound mixture with a magnesium alkoxide. The catalyst composition can be combined with a metallic hydride or, preferably, an organometallic co-catalyst, e.g., an organoaluminum compound, to form a catalyst useful for the polymerization of alpha-olefins.

30 Claims, No Drawings

POLYMERIZATION OF OLEFINS

BACKGROUND OF THE INVENTION

This invention relates to a process for polymerizing olefins. In another aspect, this invention relates to a catalyst composition for the polymerization of alpha-olefins. In another aspect, this invention relates to a process for preparing a catalyst which can be used in an alpha-olefin polymerization reaction. In another aspect, this invention relates to a catalyst composition which can be used in conjunction with a metallic hydride or organometallic co-catalyst to form a complete catalyst system useful in the polymerization of alpha-olefins. In yet another aspect, this invention relates to a catalyst composition to which a powdered diluent is added.

It is known to polymerize alpha-olefins and mixtures thereof according to the low pressure process of Zeigler. In this process, the catalysts used are prepared from mixtures of compounds of elements of Subgroups IV to VI of the Periodic Table and the organometallic compounds of the elements of Groups I to III of the Periodic Table. The polymerization is generally carried out in suspension, in solution or even in the gaseous phase.

Furthermore, processes using catalysts prepared by reacting a magnesium alkoxide compound with a compound of an element of Groups IV to VI of the Periodic Table are known. For example, according to U.S. Pat. No. 3,644,318, a compound of an element of Groups IV to VI of the Periodic Table, e.g., titanium tetrachloride, is reacted with a magnesium alkoxide to form a catalyst component. This catalyst component can then be mixed with an organoaluminum compound as co-catalyst.

The activity of an olefin polymerization catalyst is one important factor in a continuous search for the ultimate catalyst to be used in an alpha-olefin polymerization reaction. The higher the activity and productivity of the alpha-olefin polymerization catalyst, assuming the properties and qualities of the polymer product remain the same, the greater the favorability and acceptability of the catalyst for use in alpha-olefin polymerization reactions. Although catalysts that are prepared by reacting a magnesium alkoxide with a titanium compound have been found to be acceptable, improvements can be made.

It is an object of this invention, therefore, to provide an improved process for the polymerization of olefins.

Another object of this invention is to provide a novel and improved catalyst for the polymerization of alpha-olefins.

Another object of this invention is to increase the polymer production in an alpha-olefin polymerization process.

Still another object of this invention is to provide a catalyst of increased activity for the polymerization of alpha-olefins.

Other objects, aspects and the several advantages of this invention will become apparent to those skilled in the art upon the study of this disclosure and the appended claims.

SUMMARY OF THE INVENTION

The present invention provides a catalyst composition useful for the polymerization of alpha-olefins. The catalyst composition is obtained by mixing a magnesium alkoxide with an intimate mixture of a magnesium halide compound and a tetravalent, halogenated titanium compound. The catalyst composition is then combined with an organometallic co-catalyst to form a catalyst system useful in the polymerization of alpha-olefins.

One embodiment of this invention pertains to the formation of a catalyst composition wherein an intimate magnesium halide-titanium compound mixture is formed by milling and then milling the intimate mixture with a magnesium alkoxide. Many forms of milling can be used, however, it is preferred that the magnesium alkoxide is rotary ball milled with the intimate magnesium halide-titanium compound mixture as a highly active catalyst composition is thereby formed.

In another embodiment, the catalyst composition contains a powdered diluent. The powdered diluent added to the composition can be polymer fines of polymers such as polyethylene, polypropylene, poly(arylene sulfide) and the like or refractory substances such as alumina, silica, chlorinated silica and the like. It is preferred to add the powdered diluent to the catalyst composition when the magnesium alkoxide is added to the magnesium halide-titanium compound mixture in order to eliminate or reduce caking that can occur during the subsequent milling operation. The preferred powdered diluents are poly(arylene sulfide) and chlorinated silica.

In another embodiment of the invention, the catalyst composition is combined with an organometallic co-catalyst to form an active catalyst suitable for the polymerization of alpha-olefins such as ethylene. The organometallic co-catalyst can be selected from the organometallic compounds that form with the metals of Groups IA, IIA or IIIA of the Periodic Table, e.g., an organoaluminum compound.

DETAILED DESCRIPTION OF THE INVENTION

The catalyst composition of this invention is obtained by mixing a magnesium alkoxide with an intimate mixture of a magnesium halide compound and a tetravalent, halogenated titanium compound. The catalyst system, when used in combination with an organometallic compound, such as an organoaluminum compound, has been shown to be active for polymerizing olefins into normally solid polymers which can be fabricated into such useful articles as fibers, film, molded objects and the like.

The catalyst systems of this invention are especially active for the production of ethylene homopolymers or copolymers containing up to about 20 mole percent comonomer, the comonomer being selected from aliphatic 1-olefins containing from 3 to 10 carbon atoms per molecule. The catalyst system is useful in the polymerization of alpha-olefins, especially for the polymerization of alpha-olefin such as ethylene.

Any suitable magnesium alkoxide can be employed for the purpose of forming the catalyst composition of this invention as there is no restriction on the hydrocarbyl groups outside of practical considerations, e.g., ease of preparation and availability. Exemplary magnesium alkoxides can be expressed as $Mg(OR)_2$ in which R is an alkyl group containing from 1 to 20 carbon atoms. Exemplary compounds include magnesium methoxide, magnesium ethoxide, magnesium isopropoxide, magnesium 2-ethylhexyloxide, magnesium dodecyloxide, magnesium eicosyloxide. Presently preferred compounds, because of ready availability and relatively low cost, are magnesium methoxide and magnesium ethoxide. The compounds can contain up to about 3 moles of the corresponding alcohol per mole of compound.

Any suitable tetravalent, halogenated titanium compound can be used as long as the titanium has one halogen attached thereto. Suitable compounds can be represented by the formula $TiX_a(OR')_{4-a}$ in which X stands for bromine, chlorine or iodine or mixtures thereof, a is an integer of 1 to 4 and R' is an alkyl, cycloalkyl, or aryl group and combinations thereof, such as alkaryl, containing from 1 to about 20 carbon atoms. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, and the like.

The most preferred tetravalent, halogenated titanium compounds are the titanium tetrahalides which include $TiBr_4$, $TiCl_4$, $TiI_4$ and mixtures thereof. Presently preferred is $TiCl_4$ because of ready availability and relatively low cost.

The magnesium halide compounds appropriate for the purposes of this invention are the magnesium dihalides with magnesium chloride being the preferred compound. Magnesium chloride is generally employed in the form of a finely divided powder. It can be preactivated by a grinding step although such preactivation is not considered generally necessary.

The molar ratio of the magnesium halide to titanium compound can range rather widely as long as the final catalyst is effective for polymerization. However, a presently preferred molar ratio of magnesium halide to titanium compound is in the range of about 2:1 to 25:1 with the most preferred molar ratios being in the range of about 3:1 to 15:1 because catalyst activity is especially good in that range.

The molar ratio of titanium compound to magnesium alkoxide can range from about 0.1:1 to 10:1 and more preferably from about 0.5:1 to 5:1 since catalytic activity is especially high in that range.

The catalyst composition is prepared by first preparing an intimate mixture of the magnesium halide and tetravalent, halogenated titanium compound. The magnesium halide and titanium compound can be admixed in any convenient method that insures intimate dispersion of components. Preferably, admixing is performed under intensive milling conditions such as prevail in a ball mill, vibrating ball mill, tower mill and the like. A typical mill employable is a vibratory ball mill such as a Vibratom, manufactured by Siebtechnik GMBH.

The magnesium halide and titanium compound mixture is then mixed with the magnesium alkoxide in any convenient fashion. Rotary ball milling is the preferred method of treating the magnesium halide and titanium compound mixture with the magnesium alkoxide since less caking of the mixture occurs than in a vibratory mill. By rotary ball milling it is meant that conventional form of ball milling wherein a horizontal vessel partly filled with balls, small cylinders, etc., is rotated at speeds ranging from about 10–200 rpm.

Milling can be done in an inert, dry atmosphere such as nitrogen, argon and the like under subatmospheric, atmospheric or superatmospheric pressures. Cooling can be employed to avoid excessive temperatures being generated, such as about 65° C. (150° F.), which can adversely affect catalyst performance. Milling times can range from about 5 to 200 hours. Vibratory milling typically requires a shorter time and rotary ball milling typically takes a longer time.

It is within the scope of the invention to dilute the catalyst compositions with a powdered diluent. Said diluent can be polymer fines, e.g., polyethylene, polypropylene, poly(arylene sulfide) and the like or refractory substances such as alumina, silica, chlorinated silica and the like. The preferred powdered diluents are poly(arylene sulfide) and chlorinated silica. The powdered diluent is preferably added along with the magnesium alkoxide to eliminate or reduce caking that can occur during the subsequent milling operation. When catalyst dilution is employed, a rotary ball mill or vibratory mill can be used to produce the final catalyst compositions. Such diluents have particle sizes ranging from about 60 mesh to 400 mesh (250–37 microns) or finer.

The amount of diluent employed with the catalyst can vary rather widely so long as a composite active for polymerization is obtained. Generally, the composite can contain from about 1 to 90 wt% diluent.

The catalyst composition, component A, can then be combined with a co-catalyst, component B, to form a catalyst system useful for the polymerization of olefins. Component B is a hydride or organometallic compound wherein said metal is selected from an element of Groups IA, IIA and IIIA of the Periodic Table. In other words, component B can be a hydride of a metal selected from Group IA, IIA and IIIA or an organocompound of the metals. The preferred compound to be used as component B is an organoaluminum compound which can be expressed as $R''_b AlX_{3-b}$ in which R'' is a hydrocarbon radical selected from such groups as alkyl, cycloalkyl, aryl, alkaryl, aralkyl, alkenyl and the like containing from 1 to 20 carbon atoms per molecule, X is halogen or hydrogen and b is an integer of 1, 2 or 3. Exemplary compounds include trimethylaluminum, triethylaluminum, dimethylaluminum chloride, n-propylaluminum diiodide, diisobutylaluminum hydride, didodecylaluminum bromide, trieicosyaluminum, tridodecylaluminum, tricyclohexylaluminum, triphenylaluminum, diethylaluminum chloride, ethylaluminum dibromide and the like and mixtures thereof.

Any mono-1-olefin can be polymerized in the presence of the catalyst of the present invention with the preferred reactant being ethylene or ethylene plus another higher aliphatic mono-1-olefin containing from 3–10 carbon atoms. The mono-1-olefin, or mixture thereof, is polymerized by contacting the catalyst system of this invention using any of the well known methods, e.g., by contacting in solution, in suspension or in gaseous phase, at temperatures ranging from about 20°–200° C. and pressures ranging from about atmospheric to about 1000 psig (6.9 MPa g). The homopolymerization and copolymerization reactions can be conducted batchwise or in continuous fashion by employing any known process.

It is convenient when polymerizing ethylene in a bench scale process, for example, to conduct the polymerization batchwise in a stirred reactor employing a dry hydrocarbon diluent inert in the process such as isobutane, n-heptane, methylcyclohexane, benzene, toluene and the like, at a reactor temperature of about 80° C. and a reactor pressure of about 280 psig (1.9 MPa). Ethylene is admitted to the reactor as required to maintain the desired pressure. Molecular weight control agents such as hydrogen can be employed in the reactor, as known in the art, to adjust the molecular weight of the polymer.

When the selected polymerization time is reached the reaction can be terminated by discontinuing the flow of ethylene and comonomer, if used, venting unreacted monomer(s) and diluent and recovering the polymer. The recovered product can be treated to deactivate or remove catalyst residues such as by an alcohol wash, can be stabilized by admixture with an antioxidant(s) and can be dried to remove residual solvent, if present, as is known in the art. Generally, because such low amounts of catalysts residues are present in the polymer product is is not necessary to remove them to avoid discoloration of the polymer or corrosion of processing equipment. Thus, it is usually only necessary to stabilize the polymer after recovery and dry it before it is further processed into pellets and/or converted into the final shaped product.

The present invention will be better understood upon study of the following examples. The following examples are set forth as illustrative of this invention and are not meant to be restrictive in any way.

EXAMPLE 1

A series of mangesium dichloride-titanium tetrachloride mixtures was prepared by individually charging a 1 liter spherical steel vessel under nitrogen with 100 g of the mixture and 2400 g of ⅜ inch (0.95 cm) steel balls. Vibratory ball milling was employed at ambient conditions for a period of time ranging from 16-24 hours. Each sample was recovered through a restricted passage in the vessel opening which allowed passage only of the milled product. Each sample was stored under nitrogen in a dry box until further use. The mole ratio of $MgCl_2$-$TiCl_4$ ranged from 4.7:1 to 10.5:1 in the samples thus prepared.

Samples of the $MgCl_2$-$TiCl_4$ mixtures of 10 g or 20 g were subsequently rotary ball milled with suitable quantities of the magnesium alkoxide and diluent, if employed, by charging the components in a nitrogen atmosphere to a 0.24 liter ceramic vessel containing from 300-400 g of cylindrical zirconia grinding media of ½ × ½ inches (1.3 × 1.3 cm) dimensions. Each sample was mixed by rotating at ambient temperature for 24 hours at about 140 RPM. The products were recovered by passage through an 8 mesh screen and stored in a dry box under nitrogen until ready for testing as ethylene polymerization catalysts. The exact mole ratios and/or weight ratios of the components employed are detailed in subsequent examples.

EXAMPLE 2

A 3.8 liter, stirred, stainless steel reactor was employed for ethylene polymerization. The reactor was readied for each run by charging 3 liters of dry n-heptane to it, closing the port, and heating reactor and contents at 175° C. for 30 minutes. The reactor was drained and residual heptane purged with dry nitrogen. The reactor was then closed and cooled under nitrogen pressure.

The prepared reactor was purged with dry isobutane vapor and 3 ml of the co-catalyst solution of 15 wt% triethylaluminum in dry n-heptane (2.8 mmoles) was added followed by the catalyst. The reactor was closed, 2 liters of dry isobutane charged, the reactor and contents were heated to 80° C. and 100 psi (0.69 MPa) ethylene pressure added.

After a one hour polymerization run, the reaction was terminated by flashing the ethylene and isobutane from the reactor. The polymer was then recovered and weighed to obtain the yield.

Each polymer yield was divided by the weight of catalyst employed to determine the calculated productivity expressed as kg polyethylene per g catalyst per hour. When the catalyst contain a diluent, the calculated productivity is based on kg polymer per g diluted catalyst as well as kg polymer per g catalyst contained in the diluted catalyst.

The quantities of catalyst components employed, mole ratios used and results obtained are presented in Table I.

TABLE I

ETHYLENE POLYMERIZATION WITH $MgCl_4 \cdot Mg(OCH_3)_2$ CATALYSTS

| | CATALYST | | | CALCULATED MOLE RATIOS | | | Polymer | Calculated Productivities | |
|---|---|---|---|---|---|---|---|---|---|
| | | Calculated | | | | | | | |
| Run No. | Weight mg | mmoles Ti | Wt % Ti | $MgCl_2$ $TiCl_4$ | $TiCl_4$ $Mg(OR)_2$ | Al Ti | Yield g | kg polymer/g Initial[a] | catalyst/hr Final |
| 1 | 11.3 | 0.018 | 7.6 | 4.3 | 2.9 | 155 | 416 | 10.2 | 36.8 |
| 2 | 5.7 | 0.0087 | 7.3 | " | 1.4 | 322 | 235 | " | 41.2 |
| 3 | 9.4 | 0.013 | 6.7 | " | 0.72 | 215 | 202 | " | 21.5 |
| 4 | 10.6 | 0.014 | 6.3 | 5.8 | 4.7 | 200 | 373 | 14.2 | 35.2 |
| 5 | 15.9 | 0.021 | 6.2 | " | 2.3 | 133 | 596 | " | 37.5 |
| 6 | 7.7 | 0.0098 | 6.1 | " | 1.6 | 286 | 409 | " | 53.1 |
| 7 | 2.9 | 0.0037 | " | " | " | | 730 | 198 | " | 68.3 |
| 8 | 16.0[b] | 0.0034 | 6.1[c] | " | " | | 823 | 202 | " | 12.6[d] |
| 9 | 8.0 | 0.0099 | 5.9 | " | 1.2 | 283 | 362 | " | 45.2 |
| 10 | 9.9 | 0.012 | 7.6 | " | " | 233 | 434 | " | 43.8 |
| 11 | 2.0 | 0.0032 | 7.3 | 10.5 | 2.0 | 875 | 78 | 19.0 | 39.0 |
| 12 | 4.5 | 0.0069 | 6.7 | " | 1.6 | 406 | 203 | " | 45.1 |
| 13 | 3.3 | 0.0046 | | " | 1.2 | 609 | 185 | " | 56.1 |

Notes:
[a] Before admixing $Mg(OR)_2$ with $MgCl_2 \cdot TiCl_4$ catalyst.
[b] Catalyst weight excluding polyethylene diluent is 2.7 mg. calculated.
[c] Based only on catalytic component.
[d] Based on catalyst only (excluding diluent), catalyst productivity is calculated to be 74.8 kg polymer per g catalyst. Diluent is polyethylene fines dried under nitrogen at 80° C. for 24 hours. Particle size is less than 60 mesh (250 microns or less).

TABLE II
EFFECT OF ALKOXIDE ON CATALYST COMPOSITION

| | | CATALYST | | | | CALCULATED MOLE RATIOS | | | | CALCULATED PRODUCTIVITIES | | |
|---|---|---|---|---|---|---|---|---|---|---|---|---|
| | | CALCULATED | | | | | | | Polymer | | catalyst/hr | |
| | Total | Diluent Free | wt. % | mmoles | wt % | $MgCl_2$ | $TiCl_4$ | Al | Yield | kg polymer/g | | |
| Run No. | mg | mg | cat. | Ti | Ti | $TiCl_4$ | $Mg(OR)_2$ | Ti | g | Initial[e] | Undiluted | Diluted[f] |
| 14[a] | 13.3 | 13.3 | 100 | 0.017 | 6.0 | 5.8 | 2.0 | 165 | 487 | 16 | 36.6 | — |
| 15[a] | 17.8 | 3.6 | 20 | 0.0045 | " | " | " | 622 | 184 | " | 51.1 | 10.3 |
| 16[a] | 10.2 | 10.2 | 100 | 0.013 | 6.1 | " | 2.7 | 215 | 372 | " | 36.5 | — |
| 17[a] | 24.7 | 4.9 | 20 | 0.0062 | " | " | " | 452 | 228 | " | 46.5 | 9.2 |
| 18[a] | 12.0 | 2.4 | 20 | 0.0030 | 6.2 | " | 3.3 | 933 | 132 | " | 55.0 | 11.0 |
| 19[a] | 9.3 | 1.9 | 20 | 0.0025 | 6.3 | " | 4.0 | 1120 | 89 | " | 46.8 | 9.6 |
| 20[b] | 9.1 | 9.1 | 100 | 0.012 | 6.1 | " | 2.0 | 233 | 224 | " | 24.6 | — |
| 21[b] | 12.9 | 12.9 | " | 0.017 | 6.3 | " | 3.3 | 165 | 282 | " | 21.9 | — |
| 22[b] | 11.5 | 11.5 | " | 0.015 | 6.3 | " | 4.0 | 187 | 313 | " | 27.2 | — |
| 23[c] | 5.7 | 5.7 | " | 0.0076 | 6.4 | 5.2 | 2.0 | 368 | 214 | 13 | 37.5 | — |
| 24[d] | 8.0 | 8.0 | " | 0.0099 | 5.9 | 5.8 | 1.2 | 283 | 362 | 14 | 45.2 | — |
| 25[d] | 4.9 | 4.9 | " | 0.012 | " | " | " | 233 | 434 | " | 43.8 | — |

Notes:
[a] $Mg(OR)_2$ is $Mg(OC_2H_5)_2$, commercial sample.
[b] $Mg(OR)_2$ is $Mg(OCH_3)_2$, commercial sample.
[c] $Mg(OR)_2$ is $Mg(OCH_3)_2 \cdot (CH_3OH)_{1.7}$, experimental preparation.
[d] $Mg(OR)_2$ is $Mg(OCH_3)_2$, experimental preparation.
[e] Before admixing $Mg(OR)_2$ with $MgCl_2 \cdot TiCl_4$ catalyst.
[f] Polyethylene fines, see footnote d, Table I, for description.

TABLE III
EFFECT OF DILUENTS ON CATALYST ACTIVITY

| | | CATALYST | | | | CALCULATED MOLE RATIOS | | | | CALCULATED PRODUCTIVITIES kg/polymer/g catalyst/hr | | |
|---|---|---|---|---|---|---|---|---|---|---|---|---|
| | | CALCULATED | | | | | | | Polymer | | | |
| Run No. | Diluent | Total mg | Diluent Free mg | wt % cat. | mmoles Ti | wt % Ti | $MgCl_2$ $TiCl_4$ | $TiCl_4$ $Mg(OR)_2$ | Al Ti | Yield g | Initial[e] | Undiluted | Diluted |
| 26 | PPS[a] | 10.9 | 8.8 | 34.6 | 0.0048 | 6.1 | 5.8 | 2.0 | 583 | 317 | 16.1 | 83.4 | 29.0 |
| 27 | " | 4.6 | 1.5 | " | 0.0019 | " | " | " | 1470 | 381 | " | 254.[b] | 82.8 |
| 28 | " | 3.8 | 1.3 | 34.2 | 0.0017 | 6.3 | " | 2.9 | 1650 | 144 | " | 73.1 | 25.0 |
| 29 | " | 3.9 | 1.3 | 34.0 | 0.0017 | " | " | 3.9 | " | 141 | " | 108. | 36.2 |
| 30 | " | 2.6 | 0.9 | " | 0.0012 | " | " | " | 2330 | 128 | " | 142. | 49.2 |
| 31 | " | 9.1 | 3.1 | " | 0.0041 | " | " | " | 683 | 277 | " | 89.4 | 30.4 |
| 32 | Cl—$SiO_2$[c] | 10.1 | 3.4 | 34.2 | 0.0045 | " | " | 2.9 | 622 | 255 | " | 75.0 | 25.2 |
| 33 | " | 3.6 | 1.2 | 34.7 | 0.0016 | " | " | 3.8 | 1750 | 124 | " | 103. | 34.4 |
| 34 | " | 3.0 | 1.0 | " | 0.0013 | 6.1 | " | 2.9 | 2150 | 104 | " | 104. | 34.7 |
| 35 | " | 4.2 | 1.4 | 34.4 | 0.0018 | 6.2 | " | 3.9 | 1550 | 154 | " | 110. | 36.7 |
| 36 | $SiO_2$[d] | 10.2 | 6.6 | 34.2 | 0.0087 | 6.3 | " | 2.9 | 322 | 285 | " | 43.2 | 14.8 |
| 37 | " | 14.6 | 5.1 | 34.7 | 0.0065 | 6.1 | " | " | 431 | 188 | " | 36.9 | 12.9 |

[a] Polyphenylene sulfide, U.S. Pat. No. 3,354,129. Unscreened, particle range from about 20 to less than 325 mesh (840 to less than 40 microns), about 74 wt % are 40-80 mesh. Dried under nitrogen for 24 hours at 80° C.
[b] Three hour polymerization run.
[c] Chlorinated microspheroidal silica, dried in chlorine ambient at 400° C. for 30 minutes. Particle sizes ranged from about 60 to less than 325 mesh (250 to less than 40 microns), about 61 wt % ranges from about 80-200 mesh. Material used unscreened.
[d] Silica-titania cogel containing about 2.5 wt % Ti, calcined in air at 870° C. and cooled to ambient temperature under dry nitrogen. Particle size distribution similar to silica of footnote (c). Material used unscreened.
[e] Before admixing $Mg(OR)_2$ with $MgCl_2 \cdot TiCl_4$ catalyst.

The results in Table I show that $MgCl_2 \cdot TiCl_4$ catalysts of various mole ratios are significantly improved in ethylene polymerization activity by the addition of magnesium methoxide as described in this invention. Improvement is noted over the entire $MgCl_2$ to $TiCl_4$ mole ratio range of 4.3:1 to 10.5 to 1, and a ratio of 5.8:1 appears to be especially desirable. Run 8 results show that dilution of an invention catalyst with finely divided polyethylene also increases its activity even more.

Based on calculated productivity data obtained, the results show the invention catalyst containing no diluents are capable of producing polyethylene from about 1.1 to 4.8 times the quantities produced by the control catalysts containing no added magnesium methoxide.

The results presented in Table II in runs 14-19 show that magnesium ethoxide can be substituted for the methoxide to give catalyst composites quite active in ethylene polymerization. Run 24 demonstrates that magnesium methoxide containing 1.7 moles methanol per mole alkoxide is about as effective as the alcohol-free alkoxide in preparing the invention catalysts.

The enhanced activity imparted the invention catalysts by dilution with polyethylene fines is directly brought out in the results shown in runs 14 and 15 and in runs 16 and 17. Without a diluent calculated catalyst productivity is about 36.5 kg polymer per g catalyst. With a diluent calculated catalyst activity based on the $Mg(OR)_2$-promoted $MgCl_2 \cdot TiCl_4$ contained in the diluted catalyst reaches about 51 kg polymer per g catalyst in run 15 and 46.5 kg polymer per g catalyst in run 17.

The results shown in Table III demonstrate the effectiveness of several types of diluent for use with the invention catalysts. Particularly good results are shown with polyphenylene sulfide and chlorinated microspheroidal silica, e.g., calculated productivities ranging from 75-142 kg polymer per g catalyst. A silica-titania cogel is shown to be less effective than the chlorinated silica, possibly because the surface hydroxyl groups affect catalyst activity and do not permit the enhanced activity to develop as with the other diluents.

EXAMPLE 3

A series of catalysts was prepared to compare those made according to this invention with those prepared in other ways or outside the scope of this invention. For convenience the catalysts are described as follows:

A. Invention catalysts: These are described in Example 1 with the polymerization results given in Table 1, runs 6, 7, 8. The catalysts are made by vibratory ball milling $MgCl_2$-$TiCl_4$ to obtain a composite which is subsequently rotary ball milled with $Mg(OR)_2$ to produce the catalyst.

B. Invention catalysts prepared in an alternate but less preferabe manner by vibratory ball milling the $Mg(OR)_2$ with a vibratory ball milled $MgCl_2$-$TiCl_4$ composite: Each catalyst sample was prepared by vibratory ball milling the specified quantity of $Mg(OR)_2$ with the specified quantities of other components in a 1 liter, spherical stainless steel vessel containing about 2400 g of 0.95 cm diameter steel balls for 16 hours. The products were recovered as previously described. The amounts of components used are given in Table B.

TABLE B

| Run No. | Grams Components | | | $Mg(OCH_3)_2 \cdot$ (MeOH)1.7 | Mole Ratio $TiCl_4$ $Mg(OR)_2$ |
|---|---|---|---|---|---|
| | $MgCl_2 \cdot TiCl_4$[a] | Diluent[b] | $Mg(OCH_3)_2$ | | |
| B1 | 45 | 45 | 2.6 | 0 | 2.0 |
| B2 | 45 | 45 | 2.2 | 0 | 2.4 |
| B3 | 45 | 45 | 1.9 | 0 | 2.8 |
| B4 | 80 | 0 | 0 | 7.6 | 2.0 |
| B5 | 80 | 0 | 0 | 6.3 | 2.4 |

[a]$MgCl_2$/$TiCl_4$ mole ratio is 5.8:1
[b]See footnote (d) of Table III.

C. Control catalysts prepared from vibratory ball milling of $MgCl_2$ with $TiCl_4$: The specified quantities of each component were charged to a 1 liter, spherical steel vessel containing about 2400 g of steel balls and milled the specified time on a vibratory mill. The products were recovered as previously described. The amounts of components used, size balls employed and milling times are listed in Table C.

TABLE C

| Run No. | Ball Size cm | Milling Time hrs | Grams | | Mole Ratio $MgCl_2$/$TiCl_4$ |
|---|---|---|---|---|---|
| | | | $MgCl_2$ | $TiCl_4$ | |
| C1 | 1.3 | 40 | 90.0 | 12.1 | 14.8:1 |
| C2 | 1.3 | 16 | 84.0 | 15.5 | 10.7:1 |
| C3 | 0.95 | 24 | 84.1 | 15.9 | 10.5:1 |
| C4 | 0.95 | 48 | 84.1 | 15.9 | 10.5:1 |

D. Control catalysts prepared from $Mg(OR)_2$ and $TiCl_4$ by contacting a hydrocarbon-$Mg(OR)_2$ slurry with $TiCl_4$:

Control catalyst D1 was prepared by refluxing 5 g of $Mg(OCH_3)_2$(MeOH)$_{0.5}$, slurried in about 150 ml of dry n-hexane contained in a 500 ml flask, with 51.8 g of $TiCl_4$ for 4 hours (about 65° C.) while stirring. Stirring was discontinued, the mixture was cooled to room temperature, liquid decanted and the slurry was washed 3 times with 475 ml portions of fresh n-hexane. The product was dried at room temperature in a vacuum oven. The calculated molar ratio of $TiCl_4$ to $Mg(OCH_3)_2$ is 5.5:1. (The actual amount of $TiCl_4$ retained was not determined.)

Control catalyst D2 was prepared by reacting a ball milled Mg.$MgCl_2$ composite (containing 2 g Mg) with 7.9 g methyl alcohol (1.5×stoichiometric) in the presence of about 200 ml dry n-hexane at reflux for 1 hour. The mixture was refluxed an additional 4 hours while stirring and then cooled to room temperature. Then to the stirred mixture was added 86.3 g of $TiCl_4$ and about 100 ml of n-hexane and the mixture was refluxed for 4 hours, the stirring discontinued and the mixture was cooled to room temperature. The liquid was decanted and the product was washed 5 times with 450 ml portions of n-hexane. The washed product was dried at room temperature in a vacuum oven. The calculated molar ratio of $TiCl_4$ to $Mg(OCH_3)_2$ is 5.4:1. (Actual $TiCl_4$ retained not determined.)

The catalyts were subsequently employed in the polymerization of ethylene in the manner described in Example 2. The details and results obtained are presented in Table D.

TABLE D

| Catalyst No. | Catalyst | | Calculated | | Calculated Mole Ratios | | | Polymer Yield g | Calculated Productivities | Remarks |
|---|---|---|---|---|---|---|---|---|---|---|
| | Total mg | Diluent Free mg | mmoles Ti | Wt. % Ti | $MgCl_2$ $TiCl_4$ | $TiCl_4$ $Mg(OR)_2$ | Al Ti | | kg polymer/g catalyst/hr | |
| A1 | 7.7 | 7.7 | 0.0098 | 6.1 | 5.8 | 1.6 | 286 | 409 | 53.1 | invention |
| A2 | 2.9 | 2.9 | 0.0037 | 6.1 | 5.8 | 1.6 | 730 | 198 | 68.3 | " |
| A3 | 16.0[a] | 2.7 | 0.0034 | 6.1[b] | 5.8 | 1.6 | 823 | 202 | 74.8[c] | " |
| B1 | 13.8[g] | 7.1 | 0.0023 | 3.2 | 5.8 | 2.0 | 1220 | 197 | 27.7[d] | " |
| B2 | 9.3[g] | 4.8 | 0.0016 | 3.2 | 5.8 | 2.4 | 1750 | 118 | 24.6[e] | " |
| B3 | 16.5[g] | 8.4 | 0.0028 | 3.2 | 5.8 | 2.8 | 1000 | 251 | 29.9[f] | " |
| B4 | 3.9 | 3.9 | 0.0012 | 5.9 | 5.8 | 2.0 | 2330 | 202 | 51.8 | " |
| B5 | 5.6 | 5.6 | 0.0018 | 6.0 | 5.8 | 2.4 | 1560 | 190 | 33.9 | " |
| C1 | 16.3 | 16.3 | 0.0102 | 3.0 | 14.8 | na | 275 | 349 | 21.4 | control |
| C2 | 10.9 | 10.9 | 0.0090 | 3.9 | 10.7 | na | 311 | 216 | 19.8 | " |
| C3 | 14.8 | 14.8 | 0.0124 | 4.0 | 10.5 | na | 226 | 340 | 22.9 | " |

TABLE D-continued

| | Catalyst | | | | | | | | | |
|---|---|---|---|---|---|---|---|---|---|---|
| | | Calculated | | | | | | | | |
| | | Diluent | | | Calculated Mole Ratios | | | Polymer | | |
| Catalyst | Total | Free | mmoles | Wt. % | MgCl$_2$ | TiCl$_4$ | Al | Yield | Calculated Productivities | |
| No. | mg | mg | Ti | Ti | TiCl$_4$ | Mg(OR)$_2$ | Ti | g | kg polymer/g catalyst/hr | Remarks |
| C4 | 20.2 | 20.2 | 0.0169 | 4.0 | 10.5 | na | 166 | 440 | 21.8 | " |
| D1 | 14.6 | 14.6 | nd | nd | nd | nd | nd | 272 | 18.6 | " |
| D2 | 23.5 | 23.5 | nd | nd | nd | nd | nd | 252 | 10.7 | " |

Notes:
Results for catalysts A1, A2, A3 are repeated from Table I, runs 6, 7, 8, respectively.
na means not applicable
nd means not determined
(a)Includes polyethylene diluent, see footnote (d) of Table I
(b)Based only on catalytic component
(c)Calculated productivity is 12.6 kg polymer per g catalyst plus diluent
(d)Calculated productivity is 14.3 kg polymer per g catalyst plus diluent
(e)Calculated productivity is 12.7 kg polymer per g catalyst plus diluent
(f)Calculated productivity is 15.2 kg polymer per g catalyst diluent
(g)Includes silica diluent, see footnote (d) of Table III, also Table B Inspection of the data presented in Table D reveals that catalysts made according to the preferred mode of preparation (catalysts A1, A2, A3) exhibit good activity in polymerizing ethylene. That is, the best results are obtained when an MgCl$_2$.TiCl$_4$ composite is prepared by vibratory ball milling and that composite is subsequently admixed with Mg(OR)$_2$ by employing rotary ball milling.

An alternate but less preferred method of producing the catalysts is shown by the B catalysts where the MgCl$_2$.TiCl$_4$ composite is subsequently admixed with Mg(OR)$_2$ by employing vibratory ball milling. This system of mixing components appears to give erratic results which can be as good as the preferred process, e.g., polymerization results with A1 catalyst and B4 catalyst are similar but with B5 an unexpected drop in productivity occurs. However, the results with B5 catalyst are still substantially better than those obtained with control catalysts C1–C4 and D1, D2.

The substantially poorer polymerization results obtained with the C control catalysts consisting of MgCl$_2$ and TiCl$_4$ compared to the invention catalysts containing Mg(OR)$_2$ points out the unexpected beneficial nature of the combination including MgCl$_2$ and Mg(OR)$_2$. This aspect is also shown in Table 1 where initial and final calculated productivities for the catalysts are disclosed.

The relatively poor polymerization results obtained with the D1 catalyst consisting only of Mg(OR)$_2$ and TiCl$_4$ indicates again that superior catalysts are made only when TiCl$_4$, MgCl$_2$ and Mg(OR)$_2$ are combined. (The D catalysts were not analyzed, hence the amount of TiCl$_4$ present in combination with Mg(OR)$_2$ is unknown.) Furthermore, the results obtained with the D2 catalysts show that the specific manner of combining the titanium compound, magnesium halide and magnesium alkoxide can make a significant difference in catalyst activity.

Reasonable variations and modifications which will become apparent to those skilled in the art can be made in the present invention without departing from the spirit and scope thereof.

We claim:

1. A catalyst composition obtained by milling a magnesium alkoxide with a milled mixture of a magnesium chloride and a titanium tetrahalide.

2. A catalyst composition in accordance with claim 1 wherein the magnesium alkoxide is rotary ball milled with the milled mixture.

3. A catalyst composition in accordance with claim 1 wherein a powdered diluent is added to the composition.

4. A catalyst composition in accordance with claim 3 wherein said powdered diluent has a particle size of no greater than about 250 microns.

5. A catalyst composition in accordance with claim 3 wherein said powdered diluent is selected from the group consisting of polyarylene sulfide.

6. A catalyst composition in accordance with claim 1 wherein said titanium tetrahalide is titanium tetrachloride.

7. A catalyst composition in accordance with claim 1 wherein the molar ratio of the magnesium chloride to the titanium tetrahalide is in the range of about 2:1 to about 25:1 and the molar ratio of titanium tetrahlide to magnesium alkoxide is in the range of about 0.1:1 to about 10:1.

8. A catalyst composition in accordance with claim 7 wherein the molar ratio of the magnesium chloride to the titanium tetrahalide is in the range of about 3:1 to about 15:1 and the molar ratio of titanium tetrahalide to magnesium alkoxide is in the range of about 0.5:1 to about 5:1.

9. A method for preparing a catalyst composition comprising preparing a milled mixture of a magnesium chloride and a titanium tetrahalide compound, and then milling the mixture with a magnesium alkoxide.

10. A method in accordance with claim 9 wherein said milled mixture is rotary ball milled with the magnesium alkoxide.

11. A method in accordance with claim 9 wherein the milling times are in the range of about 5 to about 200 hours.

12. A method in accordance with claim 9 wherein powdered diluent is added to the composition.

13. A method in accordance with claim 12 wherein said powdered diluent is added to the composition along with the magnesium alkoxide.

14. A method in accordance with claim 12 wherein the powdered diluent added to the composition is selected from the group consisting of poly(arylene sulfide).

15. A catalyst for the polymerization and copolymerization of olefins comprising two components wherein component A is obtained by milling a magnesium alkoxide with a milled mixture of a magnesium chloride and a titanium tetrahalide compound, and component B is a metallic hydride or organometallic compound wherein said metal is selected from an element of Groups IA, IIA, and IIIA of the Periodic Table.

16. A catalyst in accordance with claim 15 wherein the magnesium alkoxide is rotary milled with said milled mixture.

17. A catalyst composition in accordance with claim 15 wherein a powdered diluent is added to the catalyst.

18. A catalyst in accordance with claim 17 wherein said powdered diluent has a particle size of no greater than about 250 microns.

19. A catalyst in accordance with claim 17 wherein said powdered diluent is selected from the group consisting of poly(arylene sulfide).

20. A catalyst in accordance with claim 15 wherein said titanium tetrahalide is titanium tetrachloride.

21. A catalyst in accordance with claim 15 wherein component B is an organoaluminum compound.

22. A catalyst in accordance with claim 21 wherein the organoaluminum compound is selected from the group consisting of trimethylaluminum, triethylaluminum, tridodecylaluminum, tricyclohexylaluminum, triphenylaluminum, diethylaluminum chloride, diisobutylaluminum hydride and ethylaluminum dibromide.

23. A catalyst in accordance with claim 15 wherein the molar ratio of the magnesium chloride to the titanium tetrahalide compound is in the range of about 2:1 to about 25:1 and the molar ratio of titanium tetrahalide compound to magnesium alkoxide is in the range of about 0.1:1 to about 10:1.

24. A catalyst in accordance with claim 23 wherein the molar ratio of the magnesium chloride to the titanium tetrahalide compound is in the range of about 3:1 to about 15:1 and the molar ratio of titanium tetrahalide compound to magnesium alkoxide is in the range of about 0.5:1 to about 5:1.

25. A method for the preparation of a catalyst which comprises forming a component A by preparing an intimate mixture by milling a magnesium chloride and a titanium tetrahalide compound and then milling said mixture with a magnesium alkoxide, and then combining component A with a component B which is a metallic hydride or organometallic compound wherein said metal is selected from an element of Groups IA, IIA, and IIIA of the Periodic Table.

26. A method in accordance with claim 25 wherein the magnesium chloride and titanium tetrahalide compound mixture is rotary ball milled with the magnesium alkoxide.

27. A method in accordance with claim 25 wherein the milling times are in the range of about 5 to about 200 hours.

28. A method in accordance with claim 25 wherein powdered diluent is added to the composition.

29. A method in accordance with claim 28 wherein said powdered diluent is added to the composition along with the magnesium alkoxide.

30. A method in accordance with claim 28 wherein the powdered diluent added to the composition is selected from the group consisting of poly(arylene sulfide).

* * * * *